United States Patent
Kato (10) Patent No.: US 9,036,285 B2
(45) Date of Patent: May 19, 2015

(54) POSITION DETECTION ENCODER

(71) Applicant: MITUTOYO CORPORATION, Kanagawa (JP)

(72) Inventor: Yoshiaki Kato, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 14/284,694

(22) Filed: May 22, 2014

(65) Prior Publication Data

US 2014/0362464 A1 Dec. 11, 2014

(30) Foreign Application Priority Data

Jun. 7, 2013 (JP) .................................. 2013-121291

(51) Int. Cl.
| | | |
|---|---|---|
| *G11B 5/09* | (2006.01) | |
| *G11B 20/10* | (2006.01) | |
| *G01D 5/244* | (2006.01) | |
| *G01D 5/245* | (2006.01) | |

(Continued)

(52) U.S. Cl.
CPC ...... *G11B 20/10259* (2013.01); *G01D 5/24428* (2013.01); *G01D 5/24476* (2013.01); *G01D 5/2454* (2013.01); *G01D 5/34746* (2013.01); *G11B 5/00813* (2013.01)

(58) Field of Classification Search
None
See application file for complete search history.

(56) References Cited

U.S. PATENT DOCUMENTS 5,068,529 A 11/1991 Ohno et al.
6,236,325 B1 * 5/2001 Kuroki et al. ................. 340/635

(Continued)

FOREIGN PATENT DOCUMENTS

JP 2009-257891 A 11/2009
JP 2013-79915 5/2013

OTHER PUBLICATIONS

U.S. Appl. No. 14/206,130 to Hiroatsu Mori et al., which was filed on Mar. 12, 2014.

(Continued)

*Primary Examiner* — Tan X Dinh
(74) *Attorney, Agent, or Firm* — Greenblum & Bernstein, P.L.C.

(57) ABSTRACT

A position detection encoder includes a scale and a detection head and has position detection circuits which are capable of outputting respective pieces of position information on $X_f$, $X_s$ two tracks. The displacement detection encoder includes: a speed detection circuit which is provided in the detection head and detects a relative speed $X_f$, $X_s$ relative to the scale; and a delay generation circuit which provides a time difference between two output request signals, the time difference being provided on the basis of a fine adjustment time tadj based on the relative speed $X_f$, $X_s$ and the respective pieces of position information $X_f$, $X_s$ on the two tracks, the output request signals $St_1$, St2 urging the first and second position detection circuits to output the pieces of position information on $X_f$, $X_s$ the two tracks.

10 Claims, 3 Drawing Sheets

(51) Int. Cl.
*G11B 5/008* (2006.01)
*G01D 5/347* (2006.01)

(56) References Cited

U.S. PATENT DOCUMENTS

| | | | |
|---|---|---|---|
| 7,663,093 B2 * | 2/2010 | Kusano | 250/231.18 |
| 8,481,915 B2 | 7/2013 | Otsuka et al. | |
| 2011/0233391 A1 * | 9/2011 | Altendorf et al. | 250/231.13 |
| 2013/0099105 A1 * | 4/2013 | Nakamura et al. | 250/231.1 |
| 2013/0292556 A1 * | 11/2013 | Nakamura | 250/231.1 |
| 2013/0292557 A1 * | 11/2013 | Nakamura | 250/231.1 |

OTHER PUBLICATIONS

Search report from E.P.O., mail date is Nov. 13, 2014.

* cited by examiner

POSITION DETECTION ENCODER

CROSS-REFERENCE TO RELATED APPLICATION

The disclosure of Japanese Patent Application No. 2013-121291 filed on Jun. 7, 2013 including specifications, drawings and claims is incorporated herein by reference in its entirety.

TECHNICAL FIELD

The present invention relates to position detection encoders, and more particularly, to a position detection encoder which is preferred for use in a linear encoder and capable of reducing a position error occurring between a plurality of tracks in the measurement axis direction by allowing position detection times on the plurality of tracks to coincide with each other even when a detection head is moved relative to a scale.

BACKGROUND ART

Disclosed in Japanese Patent Application Laid-Open No. 2009-257891 (hereafter referred to as Patent Literature 1) is a linear encoder including: a scale which is provided with two tracks (an ABS pattern and an INC pattern); and a detection head which is moved relative to the scale, the linear encoder having position detection circuits that are capable of outputting respective pieces of position information on the two tracks. Such a linear encoder is configured such that in order to increase the reliability, the same positions in the measurement axis direction on the plurality of tracks can be detected by the position detection circuits and then the resulting positions are checked against each other. That is, such a linear encoder is configured such that even when the detection head is moved relative to the scale in the measurement axis direction, the same position in the measurement axis direction can be detected on the respective tracks if the position detection times on the two tracks coincide with each other.

SUMMARY OF INVENTION

Technical Problem

However, in the linear encoder as disclosed in Patent Literature 1, since the respective position detection circuits for the two tracks have mutually different configurations, it was difficult to make the position detection times on the two tracks substantially the same. Furthermore, when the detection head was moved relative to the scale in the measurement axis direction, a positional error between the two tracks would be possibly noticeably found with the travel speed if the position detection times were not the same.

The present invention has been made in order to solve the aforementioned problems. It is therefore an object of the invention to provide a position detection encoder which can reduce a positional error occurring between a plurality of tracks in the measurement axis direction by allowing position detection times on the plurality of tracks to coincide with each other even when a detection head is moved relative to a scale.

Solution to Problem

To solve the foregoing problems, the invention according to a feature of the present application provides a position detection encoder including a scale provided with a plurality of tracks, a detection head moved relative to the scale, and position detection circuits capable of outputting respective pieces of position information on the plurality of tracks, the position detection encoder further including: speed detection means provided on the detection head, the speed detection means detecting a relative speed relative to the scale; and delay means for providing a time difference between a plurality of output request signals, the time difference being provided on the basis of a fine adjustment time based on the relative speed and the respective pieces of position information on the plurality of tracks, the output request signals urging the position detection circuits to output the position information on the plurality of tracks.

The invention according to a feature of the present application is configured to include computing means for determining time differential values of the respective pieces of position information on the plurality of tracks outputted in response to the plurality of output request signals, computing a difference value between the time differential values, and dividing the difference value by a time differential value of the relative speed so as to determine a division value, the fine adjustment time being specified so that the division value converges to zero.

The invention according to a feature of the present application is configured such that the division value for determining the fine adjustment time is a moving average of division values that are determined at each of a plurality of positions of the scale.

The invention according to a feature of the present application is configured such that the fine adjustment time is stored and the current fine adjustment time is continuously approximated to the previous fine adjustment time.

The invention according to a feature of the present application is configured such that the fine adjustment time is stored and the current fine adjustment time is approximated to the previous fine adjustment time in a stepwise manner.

The invention according to a feature of the present application is configured to include computing means for computing a difference value between the respective pieces of position information on the plurality of tracks outputted in response to the plurality of output request signals and dividing the difference value by the relative speed so as to determine a division value, the fine adjustment time being specified so that the division value converges to zero.

The invention according to a feature of the present application is configured such that the division value for determining the fine adjustment time is a moving average of division values that are determined at each of a plurality of positions of the scale.

The invention according to a feature of the present application is configured such that the fine adjustment time is stored and the current fine adjustment time is continuously approximated to the previous fine adjustment time.

The invention according to a feature of the present application is configured such that the fine adjustment time is stored and the current fine adjustment time is approximated to the previous fine adjustment time in a stepwise manner.

Advantageous Effects of Invention

According to the present invention, it is possible to reduce a positional error occurring between a plurality of tracks in the measurement axis direction by allowing position detection times on a plurality of tracks to coincide with each other even when a detection head is moved relative to a scale.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described in detail below with reference to the drawings.

Figure 1:
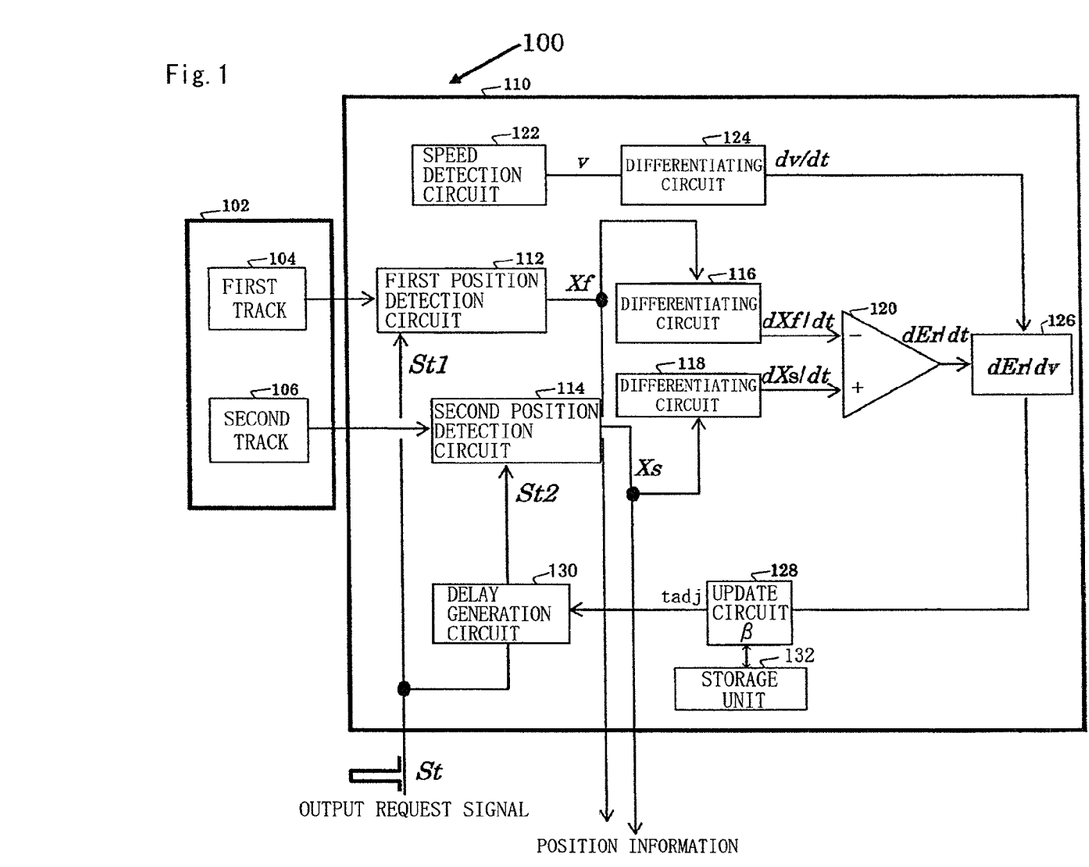
FIG. 1 is a schematic block diagram illustrating a linear encoder according to a first embodiment of the present invention.
Figure 2:
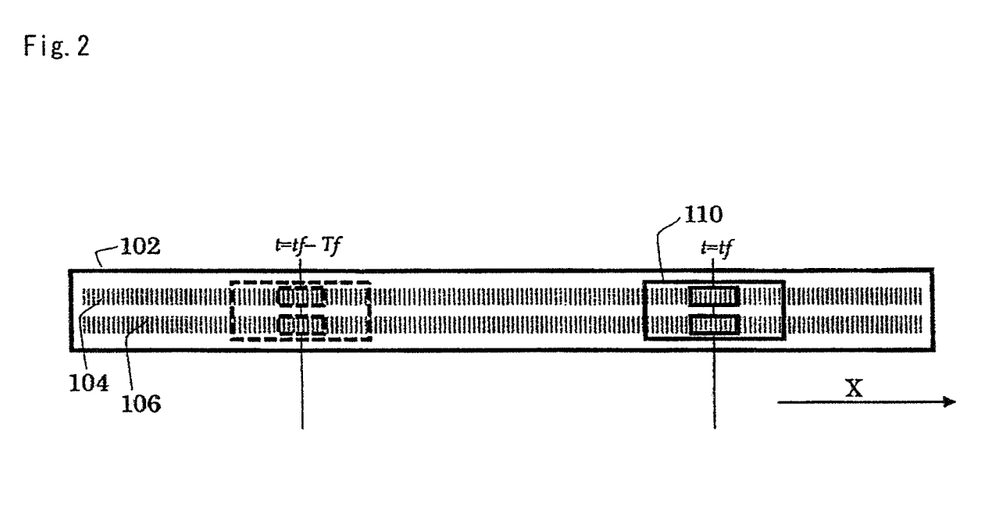
FIG. 2 is a schematic view illustrating a scale and a detection head according to the first embodiment of the present invention.

With reference to FIG. 1 and FIG. 2, a description will be made to a first embodiment of the present invention.

As shown in FIG. 1 and FIG. 2, a linear encoder 100 includes a scale 102 and a detection head 110 which is moved relative to the scale 102.

As shown in FIG. 2, the scale 102 is provided with two tracks (a first track 104 and a second track 106) which extend in parallel in a measurement axis direction X. More specifically, the first track 104 is defined as an ABS track and the second track 106 is defined as an INC track. However, both the first and second tracks may be the ABS track or the INC track.

As shown in FIG. 1, the detection head 110 is provided with a first position detection circuit 112, a second position detection circuit 114, differentiating circuits 116, 118, and 124, a difference circuit 120, a speed detection circuit (speed detection means) 122, a division circuit 126, an update circuit 128, a delay generation circuit (delay means) 130, and a storage unit 132. Note that at least the differentiating circuits 116, 118, and 124, the difference circuit 120, and the division circuit 126 constitute computing means.

The first position detection circuit 112 and the second position detection circuit 114 are capable of outputting respective pieces of position information Xf and Xs on the first track 104 and the second track 106 of the scale 102 relative to the detection head 110 in response to output request signals St1 and St2 to be discussed later. The first position detection circuit 112 processes a pattern signal of the first track 104, that is, the ABS track so as to determine and output the position information Xf (also referred to as Xf(t)). In contrast to this, the second position detection circuit 114 processes (counts) a pattern signal of a constant period of the second track 106, that is, the INC track so as to determine and output the position information Xs (also referred to as Xs(t)). The first position detection circuit 112 and the second position detection circuit 114 have time delays Tf and Ts from the point in time at which the pattern signal for each of the tracks 104 and 106 is detected to the point in time at which the pieces of position information Xf and Xs are outputted, respectively. That is, the time delays Tf and Ts are defined as the time for computing the pattern signal for each of the tracks 104 and 106. Here, when the detection head 110 is moved at a relative speed v(t) (also simply referred to with symbol v) relative to the scale 102, the position X(t0) of the detection head 110 at time t0 can be expressed by Equation (1) below:

[Equation 1]

$$X(t0) = \int_{0}^{t0} v(t)dt \qquad (1)$$

However, as shown in FIG. 2, by taking into account the time delay Tf of the first position detection circuit 112, the position information Xf(tf) on the first track 104 outputted at time tf from the first position detection circuit 112 was detected at time tf-Tf by the detection head 110 (the broken lines of FIG. 2). Thus, the position information Xf(tf) of the detection head 110 obtained at time tf by the first position detection circuit 112 can be expressed by Equation (2) below:

[Equation 2]

$$Xf(tf) = \int_{0}^{tf-Tf} v(t)dt \qquad (2)$$

In the same manner, by taking into account the time delay Ts of the second position detection circuit 114, the position information Xs(ts) on the second track 106 outputted from the second position detection circuit 114 at time ts (=tf+tadj) that is delayed from time tf by the fine adjustment time tadj was detected at time (tf+tadj)−Ts by the detection head 110. Thus, the position information Xs(ts) of the detection head 110 obtained at time ts by the second position detection circuit 114 can be expressed by Equation (3):

[Equation 3]

$$Xs(ts) = \int_{0}^{(tf+tadj)-Ts} v(t)dt + Cyaw \qquad (3)$$

Note that constant Cyaw denotes an adjustment error of the second track 106 relative to the first track 104 in the measurement axis direction X, the adjustment error being caused by a misalignment in the yaw direction of the detection head 110 relative to the scale 102.

As shown in FIG. 1, the differentiating circuits 116 and 118 are connected to the first and second position detection circuits 112 and 114, respectively. The differentiating circuits 116 and 118 differentiate the position information Xf and Xs outputted from the first and second position detection circuits 112 and 114 with respect to time, respectively. That is, the differentiating circuits 116 and 118 determine the time differential values dXf/dt and dXs/dt of the pieces of position information Xf and Xs on the two tracks 104 and 106 outputted by the two output request signals St1 and St2, respectively. That is, the differentiating circuits 116 and 118 can determine the values of Equation (4) and Equation (5) from Equation (2) and Equation (3), respectively. The time differential values dXf/dt and dXs/dt are supplied to the difference circuit 120.

[Equation 4]

$$\frac{dXf(tf)}{dt} = \frac{d\int_0^{tf-Tf} v(t)dt}{dt} \quad (4)$$

$$\frac{dXs(ts)}{dt} = \frac{d\int_0^{(tf+tadj)-Ts} v(t)dt}{dt} \quad (5)$$

As shown in FIG. 1, the difference circuit 120 computes a difference value (the time differential value of a position error Er (=Xs(ts)−Xf(tf))) dEr/dt between the mutual time differential values dXf/dt and dXs/dt and then outputs the resulting value to the division circuit 126. That is, the difference circuit 120 determines the value of Equation (6) from Equation (4) and Equation (5).

[Equation 5]

$$\frac{d(Xs(ts) - Xf(tf))}{dt} = \frac{dEr}{dt} \quad (6)$$

$$\frac{dEr}{dt} = \frac{d}{dt}\left(\int_0^{(tf+tadj)-Ts} v(t)dt + Cyaw - \int_0^{tf-Tf} v(t)dt\right) =$$

$$\frac{d}{dt}\left(\int_0^{(tf+tadj)-Ts} v(t)dt + Cyaw\right)$$

Here, assuming that the time from the position detection time tf−Tf on the first track 104 to the position detection time (tf+tadj)−Ts on the second track 106 is sufficiently short, and meanwhile, no variation is found in the relative speed v, the difference circuit 120 determines the value of Equation (7) from Equation (6). Note that in Equation (7), the time delay difference Ts−Tf is defined as a circuit time delay Td (Td=Ts−Tf).

[Equation 6]

$$\frac{dEr}{dt} = \frac{d}{dt}(tadj - (Ts-Tf)) = \frac{dv}{dt}(tadj - Td) \quad (7)$$

On the other hand, as shown in FIG. 1, the speed detection circuit 122 detects the relative speed v of the detection head 110 relative to the scale 102 and then outputs the resulting speed to the differentiating circuit 124. The differentiating circuit 124 determines the time differential value dv/dt of the relative speed v and then outputs the resulting value to the division circuit 126.

As shown in FIG. 1, the division circuit 126 divides the difference value dEr/dt by the time differential value dv/dt of the relative speed v to determine the division value dEr/dv, which is then outputted to the update circuit 128. That is, the division circuit 126 determines the value of Equation (8) from Equation (7).

[Equation 7]

$$\frac{dEr}{dv} = tadj - Td \quad (8)$$

As shown in FIG. 1, the update circuit 128 connected to the delay generation circuit 130 updates the fine adjustment time tadj that is to be set to the delay generation circuit 130. The fine adjustment time tadj is specified so as not to vary when the division value dEr/dv is zero. That is, in contrast to the previously determined fine adjustment time tadjo, the current fine adjustment time tadj can be determined as in Equation (9) or Equation (10). That is, the update circuit 128 determines the current fine adjustment time tadj on the basis of the previous fine adjustment time tadjo as shown in Equation (9) or Equation (10). Note that symbol β shown in FIG. 1 symbolically shows the use of the coefficient of the division value dEr/dv or a function that employs the division value dEr/dv as an argument.

[Equation 8]

$$tadj = tadjo - \frac{1}{k} \times \frac{dEr}{dv} \quad (9)$$

$$tadj = tadjo - sgn\left(\frac{dEr}{dv}\right) \quad (10)$$

In other words, the fine adjustment time tadj is determined so that the division value dEr/dv converges to zero. Note that the coefficient k of Equation (9) is a positive real number and can be defined as appropriate depending on the processing time intervals or the convergence accuracy or rate of the fine adjustment time tadj (the same also holds true for Equation (15)). Furthermore, the function sgn (argument) of Equation (10) is a sign function, which outputs, depending on the sign of the argument B (=dEr/dv), as shown in Equation (11), 1 for a positive argument B, 0 for 0, and −1 for a negative one (the same also holds true for Equation (16)). Note that the function sgn (argument) can be multiplied by a coefficient as appropriate. Equation (9) is intended to continuously (asymptotically) approximate the current fine adjustment time tadj to the previous fine adjustment time tadjo, whereas Equation (10) is intended to approximate, in a stepwise manner, the current fine adjustment time tadj to the previous fine adjustment time tadjo. The update circuit 128 updates the previous fine adjustment time tadjo with the current fine adjustment time tadj and then stores the resulting time in the storage unit 132.

[Equation 9]

$$sgn(B)=1(B>0), 0(B=0), -1(B<0) \quad (11)$$

As shown in FIG. 1, with respect to a first output request signal St1 for urging the first position detection circuit 112 to produce an output, the delay generation circuit 130 delays, by the fine adjustment time tadj set by the update circuit 128, a second output request signal St2 for urging the second position detection circuit 114 to produce an output. That is, the delay generation circuit 130 provides a time difference between the two output request signals St1 and St2, the time difference being provided on the basis of the fine adjustment time tadj based on the relative speed v and the respective pieces of position information Xf and Xs on the two tracks 104 and 106, the output request signals St1 and St2 urging the first and second position detection circuits 112 and 114 to output the pieces of position information Xf and Xs on the two tracks 104 and 106. The fine adjustment time tadj is configured to be updated by the update circuit 128 on an as needed basis. That is, the detection head 110 monitors the difference value dEr/dt and the time differential value dv/dt of the relative speed v of the detection head 110 and provides feedback control to the fine adjustment time tadj so that the division value dEr/dv is zero. In this manner, control is provided so that the position detection times of the first track 104 and the second track 106 coincide with each other.

Note that the first and second output request signals St1 and St2 are derived from the output request signal St and outputted from an output request circuit (not illustrated) which requests the encoder 100 from outside the encoder 100 to output the pieces of position information Xf and Xs.

As described above, in this embodiment, since feedback control is provided to the fine adjustment time tadj so that the division value dEr/dv is zero, the fine adjustment time tadj is determined so that the position detection times on the two tracks 104 and 106 coincide with each other. That is, even when a variation is found in the time delays Tf and Ts of the individual detection circuits 112 and 114, for example, due to a variation in the resistance and capacitance that are used in the first and second position detection circuits 112 and 114, an individual adjustment is not required. At the same time, provision of the feedback control allows for setting the position detection times to be the same with higher accuracy than determination of the fine adjustment time tadj by estimation simply by calculation. Thus, it is possible to prevent variations in the position error Er in the measurement axis direction X that may be caused between the two tracks 104 and 106 due to variations in the relative speed v.

Furthermore, there may occur an adjustment error Cyaw in the measurement axis direction X of the second track 106 relative to the first track 104, for example, due to a misalignment of the detection head 110 in the yaw direction. In this embodiment, even under these circumstances, the adjustment error Cyaw can be eliminated. That is, it is possible to eliminate the influence of the adjustment error Cyaw that is caused between the two tracks 104 and 106 due to a factor, like a misalignment in the yaw direction, which does not depend on the relative speed v.

Thus, in this embodiment, even when the detection head 110 is moved relative to the scale 102, it is possible to reduce the position error Er in the measurement axis direction X that occurs between the two tracks 104 and 106 by allowing the position detection times on the two tracks 104 and 106 to coincide with each other.

While the present invention was described in accordance with the aforementioned embodiment, the present invention is not limited to the first embodiment. That is, it is needless to say that improvements and modifications in design can be made without departing from the gist of the present invention.

For example, in the first embodiment, the three differentiating circuits 116, 118, and 124 are provided and the division circuit 126 computes the division value dEr/dv. However, the present invention is not limited thereto, but for example, may also be implemented as in a second embodiment shown in FIG. 3.

Figure 3:
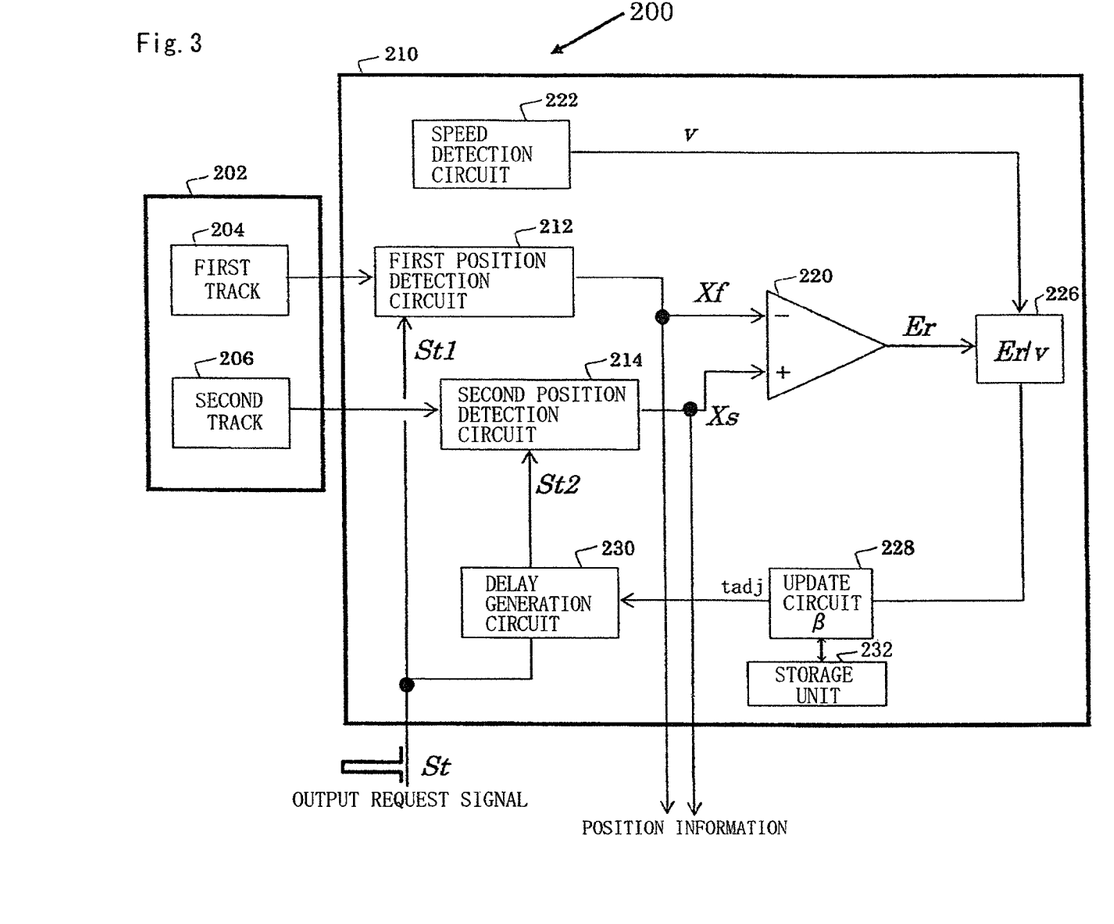
FIG. 3 is a schematic block diagram illustrating a linear encoder according to a second embodiment of the present invention.

In the second embodiment, the outputs from first and second position detection circuits 212 and 214 and the speed detection circuit 22 will not be differentiated with respect to time, but the fine adjustment time tadj is computed. A description will be made below. Note that at least a difference circuit 220 and a division circuit 226 constitute the computing means. In the descriptions below, the components that overlap those of the first embodiment are provided with the same last two digits of the symbols and will not be repeatedly explained.

The difference circuit 220 computes a difference value (position error) Er between the respective pieces of position information Xf and Xs on two tracks 204 and 206 outputted in response to the two output request signals St1 and St2 and outputs the resulting value to the division circuit 226. That is, in the difference circuit 220, the value of Equation (12) is determined from Equation (4) and Equation (5).

[Equation 10]

$$Er = \int_0^{(tf+tadj)-Ts} v(t)dt + Cyaw - \int_0^{tf-Tf} v(t)dt = \int_{tf-Tf}^{(tf+tadj)-Ts} v(t)dt + Cyaw \qquad (12)$$

Here, assuming that time from the position detection time tf−Tf on the first track 204 to the position detection time (tf+tadj)−Ts on the second track 206 is sufficiently short and meanwhile, no variation is found in the relative speed v, the difference circuit 220 determines the value of Equation (13) from Equation (12).

[Equation 11]

$$Er = v(tadj-Td) + Cyaw \qquad (13)$$

On the other hand, as shown in FIG. 3, the speed detection circuit 222 detects the relative speed v relative to a scale 202 of a detection head 210 and then outputs the resulting speed to the division circuit 226.

As shown in FIG. 3, the division circuit 226 divides the difference value Er by the relative speed v to determine a division value Er/v, which is then outputted to an update circuit 228. That is, the division circuit 226 determines the value of Equation (14) from Equation (13). Note that at this time, the adjustment error Cyaw is extremely small with respect to the relative speed v (Cyaw<<v).

[Equation 12]

$$\frac{Er}{v} = tadj - Td \qquad (14)$$

As shown in FIG. 3, the update circuit 228 connected to a delay generation circuit 230 updates the fine adjustment time tadj that is to be set to the delay generation circuit 230. The fine adjustment time tadj is specified so as not to vary when the division value Er/v is zero. That is, letting the previously determined fine adjustment time be tadjo, the current fine adjustment time tadj can be determined as in Equation (15) or Equation (16). That is, the update circuit 228 determines the current fine adjustment time tadj on the basis of the previous fine adjustment time tadjo as shown in Equation (15) or Equation (16).

[Equation 13]

$$tadj = tadjo - \frac{1}{k} \times \frac{Er}{v} \qquad (15)$$

$$tadj = tadjo - sgn\left(\frac{Er}{v}\right) \qquad (16)$$

In other words, the fine adjustment time tadj is determined so that the division value Er/v converges to zero.

As shown in FIG. 3, with respect to the first output request signal St1 for urging the first position detection circuit 212 to produce an output, the delay generation circuit 230 delays, by the fine adjustment time tadj set by the update circuit 228, the second output request signal St2 for urging the second position detection circuit 214 to produce an output. That is, the delay generation circuit 230 provides a time difference between the two output request signals St1 and St2, the time difference being provided on the basis of the fine adjustment time tadj based on the relative speed v and the respective pieces of position information Xf and Xs on the two tracks 204 and 206, the output request signals urging the first and second position detection circuits 212 and 214 to output the pieces of position information Xf and Xs on the two tracks 204 and 206. The fine adjustment time tadj is configured to be updated by the update circuit 228 on an as needed basis. That is, the detection head 210 monitors the difference value Er and the relative speed v of the detection head 210, and provides feedback control to the fine adjustment time tadj so that the division value Er/v is zero. In this manner, control is provided so that the position detection times on the first track 204 and the second track 206 coincide with each other.

Thus, in the second embodiment, since feedback control is provided to the fine adjustment time tadj so that the division value Er/v is zero, the fine adjustment time tadj is determined so that the position detection times on the two tracks 204 and 206 coincide with each other. That is, even when variations are found in the time delays Tf and Ts of the individual position detection circuits 212 and 214, for example, due to variations in the resistance and capacitance that are employed in the first and second position detection circuits 212 and 214, there is no need to make an individual adjustment thereto. At the same time, provision of the feedback control allows for setting the position detection times to be the same with higher accuracy than determination of the fine adjustment time tadj by estimation simply by calculation. Thus, it is possible to prevent variations of the position error Er in the measurement axis direction X that may be caused between the two tracks 204 and 206 due to variations in the relative speed v.

Furthermore, since this embodiment can reduce the amount of computation when compared with the first embodiment, it is possible to perform computation at higher speeds or manufacture the encoder 200 at lower costs.

Furthermore, in the aforementioned embodiment, the fine adjustment time tadj outputted from the update circuit was determined using one division value computed in the division circuit. However, the present invention is not limited thereto. For example, the division value used to determine the fine adjustment time tadj may also be a moving average of division values that are determined at each of a plurality of positions of the scale.

That is, in the first embodiment, the update circuit is capable of outputting the fine adjustment time tadj expressed by Equation (17) and Equation (18) in place of Equation (9) and Equation (10). Furthermore, in the second embodiment, the update circuit is capable of outputting the fine adjustment time tadj expressed by Equation (19) and Equation (20) in place of Equation (15) and Equation (16). Note that symbol m is an integer equal to two or greater.

[Equation 14]

$$tadj = tadjo - \frac{1}{k} \times \frac{m\sum_{i=0}^{m} Eri \times vi - \sum_{i=0}^{m} Eri \times \sum_{i=0}^{m} vi}{m\sum_{i=0}^{m} vi^2 - \left(\sum_{i=0}^{m} vi\right)^2} \quad (17)$$

$$tadj = tadjo - sgn\left(\frac{m\sum_{i=0}^{m} Eri \times vi - \sum_{i=0}^{m} Eri \times \sum_{i=0}^{m} vi}{m\sum_{i=0}^{m} vi^2 - \left(\sum_{i=0}^{m} vi\right)^2}\right) \quad (18)$$

$$tadj = tadjo - \frac{1}{k} \times \sum_{i=1}^{m} \frac{Eri}{vi} \quad (19)$$

$$tadj = tadjo - sgn\left(\sum_{i=0}^{m} \frac{Eri}{vi}\right) \quad (20)$$

As described above, the division value used to determine the fine adjustment time tadj is computed, for example, by the division circuit so as to be a moving average of division values determined at each of a plurality of positions of the scale. In this case, it is possible to control variations in the fine adjustment time tadj caused by some erroneous detection and reduce temporary variations.

Furthermore, in the aforementioned embodiment, the position detection encoder is a reflection type photoelectric linear encoder. However, the present invention is not limited thereto. For example, the position detection encoder may also be a transmission type photoelectric linear encoder. Alternatively, the position detection encoder may not be the photoelectric position detection encoder, but a position detection encoder of another detection scheme such as the magnetic position detection encoder or the capacitive position detection encoder which includes a cyclically formed electrode pattern, or an electromagnetic induction position detection encoder which includes a cyclically formed coil pattern.

Furthermore, in the aforementioned embodiment, two tracks were provided and two position detection circuits were also provided accordingly. However, the present invention is not limited thereto, For example, it may also be acceptable to provide three or more tracks in the position detection encoder.

The present invention relates to a position detection encoder which includes a scale provided with a plurality of tracks and a detection head that is moved relative to the scale and which has position detection circuits capable of outputting respective position information on the plurality of tracks. The present invention is widely applicable, for example, to the photoelectric position detection encoder, the magnetic position detection encoder, the capacitive position detection encoder, and the electromagnetic induction position detection encoder.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

That is claimed is:

1. A position detection encoder comprising:
a scale provided with a plurality of tracks,
a detection head moved relative to the scale, and
position detection circuits capable of outputting respective pieces of position information on the plurality of tracks,
the position detection encoder further comprising:
speed detection means provided on the detection head, the speed detection means detecting a relative speed relative to the scale;
delay means for providing a time difference between a plurality of output request signals, the time difference being provided on the basis of a fine adjustment time based on the relative speed and the respective pieces of position information on the plurality of tracks, the output request signals urging the position detection circuits to output the position information on the plurality of tracks;

computing means for determining time differential values of the respective pieces of position information on the plurality of tracks outputted in response to the plurality of output request signals, computing a difference value between the time differential values, and dividing the difference value by a time differential value of the relative speed so as to determine a division value, the fine adjustment time being specified so that the division value converges to zero.

2. The position detection encoder according to claim 1, wherein the division value for determining the fine adjustment time is a moving average of division values that are determined at each of a plurality of positions of the scale.

3. The position detection encoder according to claim 1, wherein the fine adjustment time is stored and the current fine adjustment time is continuously changed to a previous fine adjustment time.

4. The position detection encoder according to claim 1, wherein the fine adjustment time is stored and the current fine adjustment time is changed to a previous fine adjustment time in a stepwise manner.

5. A position detection encoder comprising:
a scale provided with a plurality of tracks;
a detection head moved relative to the scale;
position detection circuits capable of outputting respective pieces of position information on the plurality of tracks;
speed detection means provided on the detection head, the speed detection means detecting a relative speed relative to the scale;
delay means for providing a time difference between a plurality of output request signals, the time difference being provided on the basis of a fine adjustment time based on the relative speed and the respective pieces of position information on the plurality of tracks, the output request signals urging the position detection circuits to output the position information on the plurality of tracks; and
computing means for computing a difference value between the respective pieces of position information on the plurality of tracks outputted in response to the plurality of output request signals and dividing the difference value by the relative speed so as to determine a division value, the fine adjustment time being specified so that the division value converges to zero.

6. The position detection encoder according to claim 5, wherein the division value for determining the fine adjustment time is a moving average of division values that are determined at each of a plurality of positions of the scale.

7. The position detection encoder according to claim 5, wherein the fine adjustment time is stored and the current fine adjustment time is continuously approximated to a previous fine adjustment time.

8. The position detection encoder according to claim 5, wherein the fine adjustment time is stored and the current fine adjustment time is approximated to a previous fine adjustment time in a stepwise manner.

9. A position detection encoder comprising:
a scale provided with a plurality of tracks;
a detection head movable relative to the scale;
a plurality of position detectors configured to output a respective plurality of position data on the plurality of tracks;
a speed detector provided on the detection head, the speed detector configured to detect a relative speed relative to the scale; and
a delay generator configured to provide a time difference between a plurality of output request signals, the time difference being provided based on a fine adjustment time based on the relative speed and the respective plurality of position data on the plurality of tracks, the output request signals urging the plurality of position detectors to output the position data on the plurality of tracks: and
a computer configured to:
determine time differential values of the respective plurality of position data on the plurality of tracks outputted in response to the plurality of output request signals;
compute a difference value between the time differential values; and
divide the difference value by a time differential value of the relative speed so as to determine a division value, the fine adjustment time being specified so that the division value converges to zero.

10. A position detection encoder comprising:
a scale provided with a plurality of tracks;
a detection head movable relative to the scale;
a plurality of position detectors configured to output a respective plurality of position data on the plurality of tracks;
a speed detector provided on the detection head, the speed detector configured to detect a relative speed relative to the scale;
a delay generator configured to provide a time difference between a plurality of output request signals, the time difference being provided based on a fine adjustment time based on the relative speed and the respective plurality of position data on the plurality of tracks, the output request signals urging the plurality of position detectors to output the position data on the plurality of tracks; and
a computer configured to:
compute a difference value between the respective plurality of position data on the plurality of tracks outputted in response to the plurality of output request signals; and
divide the difference value by the relative speed so as to determine a division value, the fine adjustment time being specified so that the division value converges to zero.

* * * * *